United States Patent [19]

Ishii

[11] Patent Number: 4,775,970

[45] Date of Patent: Oct. 4, 1988

[54] OPTICAL RECORDING/REPRODUCING APPARATUS FOR CARDS WITH REPRODUCTION LIGHT BEAM AXES FROM A SOURCE AND INTO A DETECTOR BEING PARALLEL TO THE CARD

[75] Inventor: Tamotsu Ishii, Kanagawa, Japan

[73] Assignee: Sony Incorporation, Shinagawa, Japan

[21] Appl. No.: 905,390

[22] PCT Filed: Dec. 18, 1985

[86] PCT No.: PCT/JP85/00692

§ 371 Date: Aug. 22, 1986

§ 102(e) Date: Aug. 22, 1986

[87] PCT Pub. No.: WO86/03874

PCT Pub. Date: Jul. 3, 1986

[30] Foreign Application Priority Data

Dec. 24, 1984 [JP] Japan ............................ 59-195758[U]

[51] Int. Cl.[4] ........................ G11B 7/08; G11B 27/36
[52] U.S. Cl. .................................... 369/54; 360/2;
235/454; 369/58; 369/100
[58] Field of Search ............... 369/54, 58, 100, 116;
358/342; 360/2; 235/439, 454, 455, 458, 462,
468, 469, 470; 350/401

[56] References Cited

U.S. PATENT DOCUMENTS 4,030,835 6/1977 Firester et al. ............... 369/58 X
4,041,279 8/1977 Foote ........................... 235/454 X
4,197,011 4/1980 Hudson ........................ 369/54 X
4,213,158 7/1980 DeBenedictis ................ 358/342 X
4,251,129 2/1981 Suzki et al. .................. 350/401 X
4,303,341 12/1981 Kleinknect et al. ........... 369/58 X
4,363,118 12/1982 Roach et al. ................. 369/54 X
4,488,279 12/1984 Wilkinson et al. ............ 369/58 X
4,642,803 2/1987 Drexler ....................... 369/54

FOREIGN PATENT DOCUMENTS 58-500462 3/1983 Japan .

Primary Examiner—Raymond F. Cardillo
Assistant Examiner—W. R. Young
Attorney, Agent, or Firm—Hill, Van Santen, Steadman & Simpson

[57] ABSTRACT

A recording/reproducing apparatus for an optical recording card is disclosed, which comprises an optical recording card (10) provided with an optical recording medium (11), a recording light source (5) for recording an information signal on the recording medium (11), a reproduction light source (1) for reproducing the information signal recorded on the recording medium (11) and a line sensor (15) for reading out the information recorded on the recording medium (11) from the light beam reflected from the recording medium (11). A light path of a light beam emitted from the recording light source (5), a light path of a light beam emitted from the reproduction light source (1), and a light path of the light beam reflected by the recording medium (11) are independent of one another.

6 Claims, 2 Drawing Sheets

OPTICAL RECORDING/REPRODUCING APPARATUS FOR CARDS WITH REPRODUCTION LIGHT BEAM AXES FROM A SOURCE AND INTO A DETECTOR BEING PARALLEL TO THE CARD

TECHNICAL FIELD

This invention relates to a recording/reproducing apparatus for an optical recording card used for recording and reproduction of an information signal in a memory card or the like using an optical recording medium and, more particularly, to an optical recording/reproducing apparatus with a function for simultaneously monitoring the information signal at the time of recording.

BACKGROUND ART

An optical recording card such as a memory card using an optical recording medium has been usually used for recording and reproduction of information signals with an optical recording/reproducing apparatus having a construction as shown in FIGS. 3A, 3B and 4.

FIG. 3A schematically shows the construction of a recording system of a prior art optical recording/reproducing apparatus. A laser beam emitted from a laser beam source 21 for recording is led through a collimator lens 22 to a rotary polygonal mirror 23. The laser beam reflected by the rotary polygonal mirror 23 is passed through an objective 24 to an optical recording medium 25 of an optical recording card 26. On the optical recording medium 25 of the optical recording card 26, an information signal is optically recorded in each of the pits scanned by the laser beam which is reflected with the rotation of the rotary plygonal mirror 23 at a predetermined timing.

FIG. 3B schematically shows the construction of a reproducing system of the prior art optical recording/reproducing apparatus. A light beam emitted from a light source, i.e., a light-emitting diode 31, for reproduction is passed through a condenser 32 to a half mirror 33. The light beam reflected by the half mirror 33 is incident through a focusing lens 34 on the optical recording medium 25 of the optical recording card 26. The light beam reflected by the recording medium 25 is transmitted through the half mirror 33 to be incident on a line sensor 35 consisting of a CCD (Charge Coupled Device) for reading the information signal. The information signal recorded on the optical recording medium 25 of the optical recording card 26 is read out through conversion of the light beam emitted from the light-emitting diode 31 and reflected by the optical recording medium 25 into an electric signal corresponding to the amount of reflected light beam by the line sensor 35, on which the reflected light beam is incident through the half mirror 33.

With the prior art optical recording/reproducing apparatus, recording and reproducing optical systems are arranged separately as shown in FIG. 4. In this case, the operations of recording and reproducing the information signal are effected at different positions.

With the prior art optical recording/reproducing apparatus where the recording and reproducing systems are provided separately, simultaneous monitoring may not be obtained at the time of the recording operation because the operations of recording and reproducing the information signal are performed at different positions. Further, the light beam for reproducing the information signal is attenuated to one-fourth of the light beam emitted from the light source for reproduction even at the maximum by the half mirror provided in the reproducing system. Therefore, an output having a sufficient signal level may not be obtained from the CCD line sensor. To increase the signal level of the output it is necessary to extend the charge storage time of the CCD line sensor. In this case, a high speed operation may not be obtained.

The present invention has been made in light of the foregoing problems, and its object is to provide a recording/reproducing apparatus for an optical recording card, which has a novel construction, permits increase of the reproduction output level to increase the operation speed and permits simultaneous monitoring at the time of recording of the information signal.

DISCLOSURE OF THE INVENTION

The recording/reproducing apparatus for an optical recording card according to the present invention comprises an optical recording card provided with an optical recording medium, a recording light source for recording an information signal on said recording medium, a lens for focusing a light beam emitted from said recording light source on said recording medium, a reproduction light source for reproducing the information signal recorded on said recording medium, and a line sensor for reading out the information signal recorded on said recording medium by the light beam reflected from said recording medium, said apparatus being provided independently of one another with a light path, along which the light beam from said recording light source is supplied so as to be incident on said recording medium, a light path, along which the light beam from said reproduction light source is supplied so as to be incident on said recording medium, and a light path, along which the light beam emitted from said reproduction light source is led after reflection by said recording medium.

With this recording/reproducing apparatus, the light beams emitted from the recording and reproduction light sources are supplied along the independent light paths to illuminate the recording medium. Further, the light beam emitted from said reproduction light source and reflected by said recording medium is supplied along the reflection light path independent of the incidence light path to the line sensor, whereby the information signal recorded on said recording medium is read out by the line sensor.

BRIEF DESCRIPTION OF THE DRAWINGS

FIGS. 3A, 3B and 4 are block diagrams schematically showing the construction of a prior art optical recording card recording/reproducing apparatus, in which FIG. 3A shows a recording system, FIG. 3B shows a reproducing system, and FIG. 4 schematically shows the construction of the entire apparatus.

BEST MODE FOR EXECUTING THE INVENTION

An embodiment of the optical recording card recording/reproducing apparatus according to the invention will now be described in detail with reference to the drawings.

Figure 1:
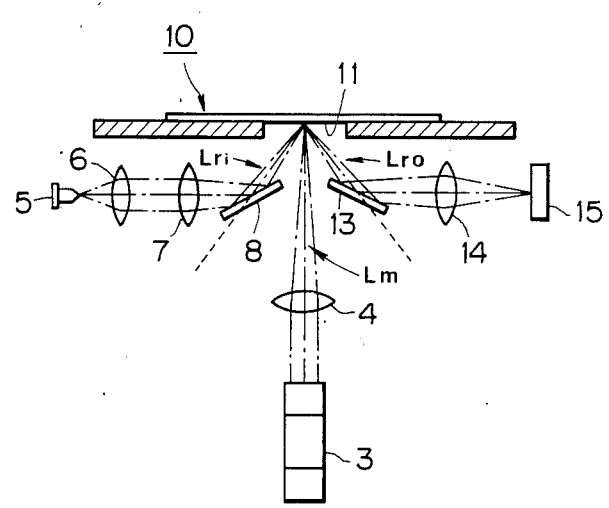
FIGS. 1 and 2 are block diagrams showing an embodiment of the optical recording card recording/reproducing apparatus according to the present invention, in which FIG. 1 schematically shows the construction of the entire apparatus, and FIG. 2 schematically shows a reproducing system.
Figure 2:
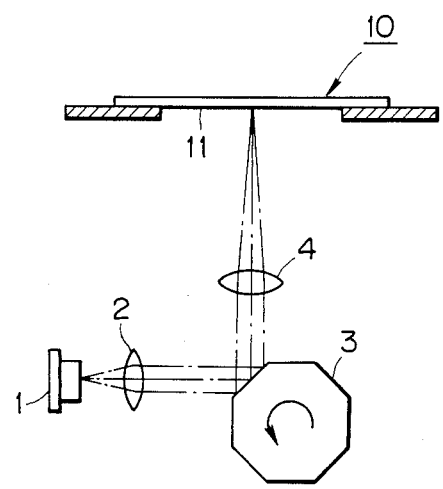
Figure 3A:
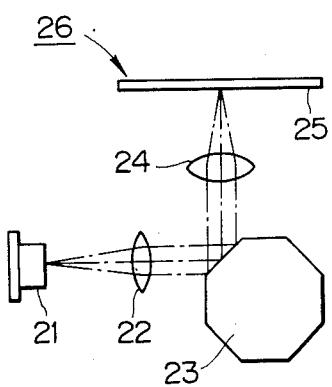
Figure 3B:
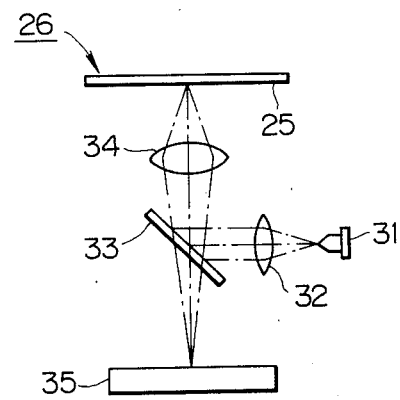
Figure 4:
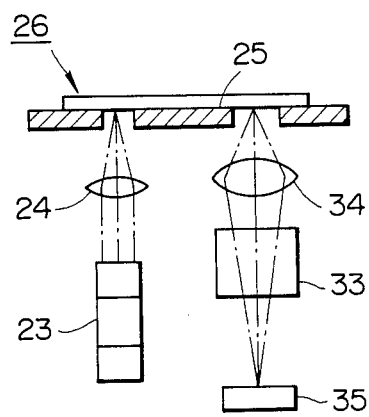

In the embodiment shown in FIGS. 1 and 2, a laser beam source 1 is provided as a recording light source for recording an information signal on an optical recording medium 11 provided on an optical recording card 10. As shown in FIG. 2, a laser beam emitted from the laser beam source 1 is collimated through a collimator lens 2 into a parallel light beam. The parallel beam is then supplied to a rotary polygonal mirror 3. The light beam reflected by the rotary polygonal mirror 3 is incident through an objective 4 on the optical recording medium 11 of the optical recording card 10. The rotary polygonal mirror 3 reflects the laser beam as it is rotated at a predetermined timing. Thus, the optical recording medium 11 of the optical recording card 10 is scanned by the laser beam, whereby the information signal is successively optically recorded in individual pits. The rotary polygonal mirror 3 may be replaced with an optical scanner, e.g., a galvanomirror or a light modulator, for scanning the optical recording medium 11 of the optical card 10 with the laser beam.

A light-emitting diode 5 is used as a reproduction light source for reproducing the information signal recorded on the optical recording medium 11 of the optical recording card 10. The light beam emitted from the light-emitting diode 5 is supplied through a condenser 6 and an objective 7 to a first reflecting mirror 8 to be reflected by the objective 7 of the first reflecting mirror 8 and then focused on the optical recording medium 11 of the optical recording card 10. The light beam reflected by the optical recording medium 11 of the optical recording card 10 is reflected by a second reflecting mirror 13 to illuminate a CCD line sensor 15 for reading the information signal through an auxiliary lens 14. The information signal recorded on the optical recording medium 11 of the optical recording card 10 is read out through conversion into an electric signal according to the amount of reflected light beam, which has been emitted from the light-emitting diode 5 and is reflected by the optical recording medium 11, by the line sensor 15, on which the reflected light beam is incident through the second reflecting mirror 13.

In the above embodiment, the axis of the recording laser beam emitted from the laser beam source 1 and the axis of the reproduction light beam emitted from the light-emitting diode 5 lie in perpendicular planes, and a light path Lm, along which the light beam emitted from the recording light source is supplied to be incident on the optical recording medium 11 of the optical recording card 10 and a light path Lri, along which the light beam emitted from the light-emitting diode 5 is supplied so as to be incident on the optical recording medium 11, and a light path Lro, along which the light beam emitted from the light-emitting diode 5 is supplied after reflection by the optical recording medium 11 are provided independently of one another.

In the above embodiment, the laser beam emitted from the laser beam source 1 and light beam emitted from the light-emitting diode 5 are supplied along the light incidence paths Lm and Lri, which are provided independently of each other, to illuminate the optical recording medium 11 of the optical recording card 10. The reflected light beam, which is emitted from the light-emitting diode 5 and is incident on the optical recording medium 11, is supplied along the reflected light path Lro, which is provided independently of the light paths Lm and Lri, to the line sensor 15. Thus, the operations of recording and reproducing the information signal are performed at a coincident position, and the recording and reproducing operations are performed simultaneously. That is, the information signal may be simultaneously monitored at the time of recording. In the reproducing system, the light beam of the light-emitting diode 5 may be efficiently supplied by the total reflecting mirrors 8 and 13 to the CCD line sensor 15 without using the half mirror having large loss of the light beam. Thus, it is possible to provide an increased level of the reproduction output of the CCD line sensor 15 for high speed operation. Further, it is possible to provide the light-emitting diode 5 and lenses 6 and 7 on an extension of the axis of the light path Lri, along which the reproducing light beam is supplied to be incident on the optical recording medium 11 of the optical recording card 10 and direct the light beam of the light-emitting diode 5 directly to the optical recording medium 11 of the optical recording card 10 without using the reflecting mirror 8. Similarly, the auxiliary lens 14 and CCD line sensor 15 may be provided on the extension of the axis of the light path Lro to omit the total reflecting mirror 13.

What is claimed is:

1. A recording and reproducing apparatus for an optical recording card comprising:

an optical recording card provided with an optical planar recording medium;

an optical recording system including a recording light source for recording an information signal on said recording medium, scanning means for scanning a light beam emitted from said recording light source in a direction substantially perpendicular to the plane of said card, a first focusing lens for coverting a scanning light beam from said scanning means into a small diameter beam for recording on said recording medium; and an optical reproducing system including a reproducing light source for reproducing said information signal recorded on said recording medium, a line sensor for reading out said information signal with the light beam reflected by said recording medium which is emitted from said reproducing light source, and a second focusing lens for focusing the light beam emitted from said reproducing light source and reflected by said recording medium onto said line sensor;

the optical axis of the light beam emitted from said reproducing light source and the optical axis of the light beam incident on said line sensor being substantially parallel to each other and substantially parallel to the plane of said card.

2. A recording and reproducing apparatus for an optical recording card according to claim 1, wherein said recording light source is a laser diode, and said reproducing light source is a light-emittimg diode.

3. A recording and reproducing apparatus for an optical recording card according to claim 2, wherein the light beam emitted from said reproducing light source is deflected at an obtuse angle by a first reflecting mirror so that it is incident upon said recording medium, and the reflected light beam of said reproducing light source reflected by said recording medium is deflected at an obtuse angle by a second reflecting mirror before passing through said second focusing lens to said line sensor.

4. A recording and reproducing apparatus for an optical recording card according to claim 3, wherein said scanning means is a rotary polygonal mirror which is rotatable about an axis which is parallel to the plane of said card.

5. A recording and reproducing apparatus for an optical recording card according to claim 4, wherein the light beam emitted from said recording light source which is incident on said recording medium is deflected by said rotary polygonal mirror in a substantially perpendicular direction and then passes through said first focusing lens and is incident substantially perpendicularly on said planar acard.

6. A recording and reproducing apparatus for an optical recording card according to claim 5, wherein the light beam emitted from said recording light source is incident on said recording medium between said first and second reflecting mirrors.

* * * * *